Aug. 29, 1944.   T. J. SMULSKI   2,357,280
WINDSHIELD WIPER ARM
Original Filed March 10, 1941   2 Sheets-Sheet 1
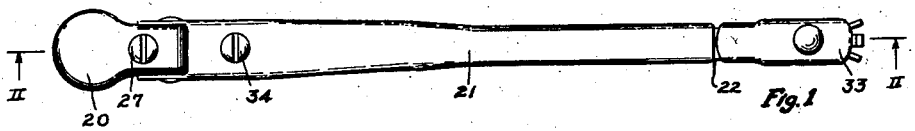
Fig. 1
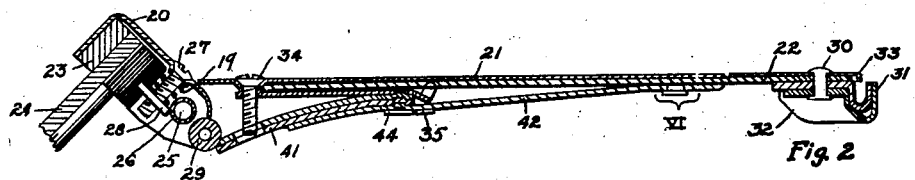
Fig. 2
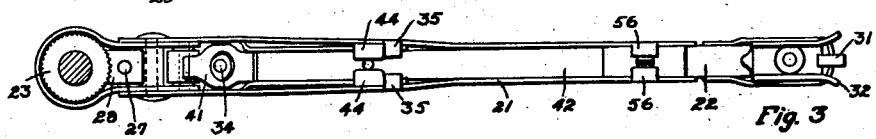
Fig. 3
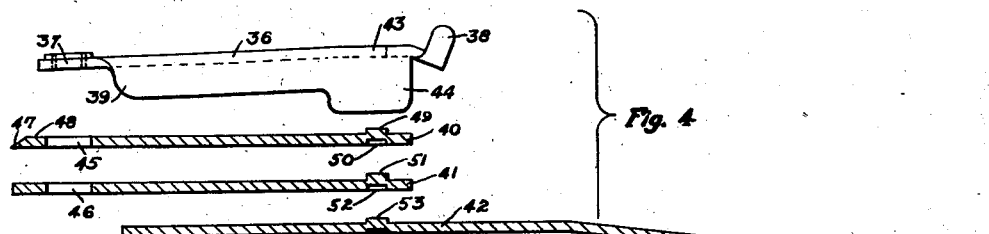
Fig. 4
Fig. 5a
Fig. 5b
Fig. 5c
Fig. 6
Fig. 7
Fig. 8
Fig. 9
INVENTOR
Theodore J. Smulski
BY Alois W. Graf
ATTORNEY Aug. 29, 1944.　　　T. J. SMULSKI　　　2,357,280
WINDSHIELD WIPER ARM
Original Filed March 10, 1941　　2 Sheets-Sheet 2

INVENTOR
Theodore J. Smulski
BY
ATTORNEY

Patented Aug. 29, 1944

2,357,280

UNITED STATES PATENT OFFICE 2,357,280

WINDSHIELD WIPER ARM

Theodore J. Smulski, Gary, Ind., assignor to Productive Inventions, Inc., a corporation of Indiana Original application March 10, 1941, Serial No. 382,503. Divided and this application December 24, 1942, Serial No. 470,035

9 Claims. (Cl. 287—53)

My invention relates to windshield wiper arms and more particularly to multi-section arms which are suited for the replacement of various different original equipment windshield wiper arms. This application is a division of my application for Windshield wiper arms, Serial No. 382,503 filed March 10, 1941, now Patent No. 2,326,402.

Each year when the automobile manufacturers announce new models of automobiles, numerous new shapes and sizes of windshield wiper arms appear on these automobiles as original equipment. This has increased the number of different arms so greatly that the automobile service stations find it an economic burden to attempt to carry an exact replacement arm for every arm still in use. Certain automobile manufacturers have also recognized that it is highly desirable if their authorized automobile dealers and service stations would have available a suitable windshield wiper arm which could be used for the replacement of worn or defective original equipment without the disadvantage of a large inventory and the inconvenience encountered when the stock of the dealer or authorized service station does not have a particular windshield wiper arm.

It is, therefore, an object of this invention to provide an improved windshield wiper arm which will overcome the above mentioned disadvantages and which will be simple and reliable in operation.

It is another object of this invention to provide a windshield wiper arm which may be readily attached to the various different types of shaft members of windshield wiper mechanisms.

Still another object of this invention is to provide a new and improved windshield wiper arm which may be swung or moved away from the windshield together with the wiping element and resiliently retained in such position to provide free and unobstructed access to the surface of the windshield for washing or cleaning.

For a better understanding of this invention together with further objects and advantages thereof, reference is had to the following description taken in connection with the accompanying drawings in which—

Figure 1 is a top view of the wiper arm in the normal operative position;

Figure 2 is a cross-sectional view of the arm of Figure 1 when the arm is in a position moved away from the windshield;

Figure 3 is a bottom view of the wiper arm;

Figure 4 is an exploded view of the adjustable tension leaf spring assembly of the wiper arm;

Figure 10:
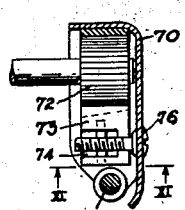
Figure 11:
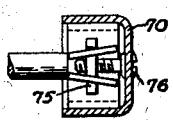

Figures 5a, 5b and 5c comprise top, side and end views of one of the parts of the wiper arm;

Figure 6 is an enlarged view of a portion VI of the arm of Figure 2, showing the arrangement for permitting extensible adjustment of the arm and for retaining such adjustment in position;

Figure 7 is a cross-sectional view showing how the inner section of the arm is attached to a different type windshield wiper shaft member;

Figure 8 illustrates the construction of a portion of the assembly of Figure 7;

Figure 9 is another view showing how the inner section of the arm is attached to another type of shaft member of a windshield wiper mechanism;

Figure 10 is a cross-sectional view which shows a modified form of attachment means supported by the inner section of a wiper arm;

Figure 11 is a cross-sectional view of Figure 10 along the lines XI—XI; and

Figure 12:
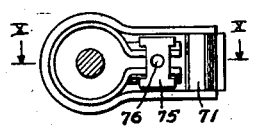
Figure 13:
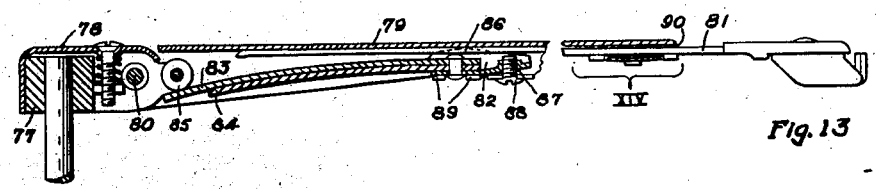
Figures 14, 15:
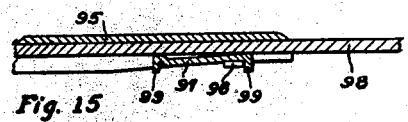
Figure 16:
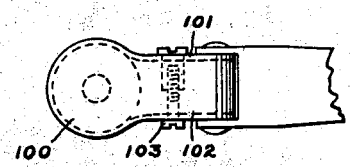

Figure 12 is a view from the inside of the inner section of the wiper arm attachment arrangement shown in Figure 10;

Figure 13 shows a wiper arm embodying certain modifications of this invention; and Figure 14 is an enlarged view of a portion of Figure 13;

Figure 15 illustrates another manner of retaining the adjustable portions of the arm in position;

Figure 16 illustrates another modification of a manner of attaching the inner sections of wiper arms to the shaft members of windshield wiper mechanisms.

Referring to Figures 1, 2 and 3 of the drawings, I have shown therein a windshield wiper arm having an inner section 20, an intermediate section 21 which is pivotally mounted on the inner section and an outer section 22 which is mounted on and longitudinally adjustable with respect to the intermediate section 21. The inner section 20 is provided with means for securing the section to the shaft member 23 of a windshield wiper mechanism. This shaft member 23 in some instances is an enlarged member having a serrated surface, and it is securely fastened to a smaller shaft 24. The outer surface of the shaft member 23 is fractionally secured to the inner section of the wiper arm. The intermediate section 21 which is preferably of channel-like foration is pivotally mounted upon the inner section 20 by means of a pivot pin 25 which preferably is surrounded by a sleeve 26, the purpose of which presently will become apparent. A screw member 27, which is accessible from the top of the inner section or attachment housing 20 supports a clamping or wedge member 28 having a concave surface, which may be serrated, on one side; and on the opposite side a smooth surface which engages the thrust surface of the sleeve 26 to cause the concave surface of the clamping wedge to be thrust against the surface of the shaft member 23 upon actuation of the screw 27. It has been found preferable, in order to retain the screw member 27 and the clamping or wedge member 28 in easy readily operative relation to each other, to surround the screw member 27 with a coil spring 19 bearing against the wedge member and the inner surface of the inner arm section 20. The inner section 20 is furthermore provided with a contact member 29 which is engaged by a spring member mounted upon the intermediate section 21 to bias the remaining sections of the wiping arm toward or away from the windshield.

An outer section 22 is mounted on and longitudinally adjustable with respect to the intermediate section 21 which has a portion of the channel adjacent its end tapered inwardly to form a guide for the outer section. The outer section 22 is provided at its free end with a windshield wiper blade attachment means which is pivotally mounted at 30 so as to be angularly positioned to one side or the other relative to section 22 thereby to position the wiper blade in alignment with the edge of the windshield on either the right or left portions of the windshield. This attachment means does not form any part of my invention, but is the invention of John W. Anderson which is described and claimed in an application, Serial No. 282,008, filed June 30, 1939, now Patent No. 2,290,140 dated July 14, 1942, for a Windshield wiper arm and which is assigned to the same assignee as the present application. This attachment means may be briefly described as a hook 31 which is supported between a pair of ears on a channel-like portion 32 which portion engages the sides of the windshield wiper blade connector. The hook 31, the channel member 32 and a cap 33 are assembled on the outer extremity of the outer section 22 by the pivot rivet 30.

The intermediate section 21 is provided with a spring assembly, the parts of which are shown in exploded relation to each other in Figure 4. This spring assembly is supported on the inner portion of section 21 by a screw member 34 and inwardly turned portions 35 of the channel-like body of the section 21. This spring assembly comprises a lever-like retainer 36 and one or more leaf spring members. The retainer lever 36 is provided at one end with a threaded aperture 37 for cooperation with the screw member 34, and at the opposite end with a pair of rocker portions 38 which engage the underside of the top portion of the channel-like body of the intermediate section 21. The retainer member 36 has a channel-like portion 39 for receiving a plurality of spring members such as 40, 41 and 42 and which are retained in position by a recess 43 and an inwardly turned portion or portions 44 of the channel-like portion 39. The spring members 40 and 41 are each provided with suitable apertures 45 and 46 respectively, through which the lower extremity of the screw member 34 may extend without interfering with the operation of the wiper arm. The spring member 40 is provided at one extremity with a pair of surfaces 47 and 48 arranged at angles to each other so that they may selectively be engaged with the contact member 29 of the inner wiper arm section 20. The other extremity of the spring member 40 is provided with a projection 49 which fits into the recess 43 of the assembly member 36. Directly underneath the projection 49 there is provided an indentation 50 which is adapted to receive the projection 51 on one extremity of the spring member 41. Similarly under the projection 51 of the spring member 41 there is a depression 52 adapted to receive a projection 53 located at an intermediate point of a spring member 42. The leaf spring member 41 assists the spring member 40 in applying a spring bias to the contact member 29 of the inner section 20. A portion of the leaf spring 42 further supplements the bias to be exerted on the inner section, and the remainder of the leaf spring 42 supplies bias to a bearing member 54. Adjacent to one extremity of the spring member 42 there is provided an aperture 55 for receiving a lug member 57 of the bearing sleeve 54 thereby to retain it in position. The bearing member 54 and one extremity of the spring 42 are supported upon turned in portions 56 of the channel-like portion of the intermediate section 21.

In Figure 7 there is shown the inner section 20 of the windshield wiper arm attached to a shaft member 58 of a windshield wiper actuating mechanism. This shaft member 58 is provided with a tapered serrated shoulder 59 and a reduced threaded portion 60. In some wiper mechanisms this type of actuating shaft is relatively hard and in other mechanisms it is relatively soft. In order to provide a member which can be mounted on any shaft irrespective to the degree of hardness, an apertured metal cup 61 of soft steel is mounted so that the aperture will engage the serrated shoulder portion 59 of the actuating mechanism. In the event that the shoulder is of relatively softer material it would be desirable to provide a harder material for engagement therewith. To this end there is provided a washer member 62 which has its inner and outer edge surfaces of serrated formation. The outer serrated edges of the washer 62, which is illustrated in greater detail in Figure 8, engage the inner surfaces of the apertured metal cup 61. Inner serrated surfaces of the washer 62 will bear against the taper shoulder 59. These two members, the cup 61 and the washer 62, are held in fixed engagement with the taper shoulder 59 of the wiper shaft 58 by means of a threaded nut or sleeve 63. The wedge 28 is adjusted by the screw member 27 so as to force the wedge against the cup member 61 so that there is good frictional contact between the inner surface of the wiper arm section 20 and the outer surface of the metal cup 61. The intermediate and outer sections of the wiper arm are mounted upon the pivot pin 64 which has been shown as being provided with a sleeve 65 for engagement with the smooth edge of the wedge member 28.

In some instances the actuating mechanism of a windshield wiper is provided with a shaft of the type illustrated in Figure 9. The shaft 66 supported a wire arm which engaged a hole near the end of the arm and which was retained by a keeper member engaging a groove portion 67 on the shaft 66. In order that the present arm may be used on such shaft a bushing or sleeve 68 is secured to the reduced portion of the shaft by means of a pin 69. The clamping member or wedge 28 in this adjusted position engages the outer surface of the sleeve 68 thereby forcing the greater portion of the sleeve 68 into frictional engagement with the inner surface of the housing or inner arm section 20.

From the description and illustration of the ...ations shown in Figures 7 and 9 together with the arrangement shown in Figure 2, it will be apparent that the arm shown in Figures 1, 2 and 3 is universally applicable to the various types of shaft members of windshield wiper mechanisms. Thus substantially all types of wiper mechanisms still in use today may be fitted with the present arm.

While there has been shown in Figures 2 and 3 a preferred form of wiper shaft engaging means for the inner section 20 of the windshield wiper arm, another satisfactory arrangement is illustrated in Figures 10 to 12. In this arrangement the attachment housing or inner section 70 of a windshield wiper arm is provided with a pivot 71 to which the other section or sections of the arm are attached. Figure 10 is a cross-sectional view looking in the direction of the lines X—X of Figure 12; and Figure 11 is a cross-sectional view looking in the direction of the lines XI—XI of Figure 10. From these figures it will be seen that the windshield wiper shaft member 72 is embraced by a flexible clamping band 73, the ends of which are arranged at angles to each other and to the plane of the body or circular portion of the band. Each of these ends is provided with a transversely located recess 74 in which there is mounted an actuating member 75. The actuating member 75 is supported by a screw member 76 which is mounted on the inner arm section 70 so as to be operable from the top of the inner section. Since the ends of the band member are arranged at angles to each other it will become apparant that actuation of the member 75 by the screw 76 will tend to draw the ends of the band 75 together thereby securely embracing the wiper shaft member 72. While this band member has been illustrated as embracing the shaft member of the type having a serrated edge, it of course will be apparent to those skilled in the art that the band member will be capable of securely fastening the arm to windshield wiper actuated shafts which have been prepared with adaptor mechanisms similar to those illustrated in Figures 7 to 9.

A further modification of some of the features of this invention are illustrated in Figures 13 and 14, wherein the shaft member 77 of a windshield wiper mechanism is embraced by a wedge and screw member mounted within an inner arm section 78 or clamping housing similar to the arrangement illustrated in Figures 2 and 3. An intermediate arm section 79 is pivotally mounted upon a pivot pin 80 located upon the inner section 78. An outer section 81 is mounted on and longitudinally adjustable with respect to the intermediate section 79. The intermediate section 79 is provided with a spring assembly comprising a retainer member 82 which supports a plurality of leaf spring members such as 83 and 84, at least one of which engages a contact member 85 mounted adjacent one end of the inner section 78. The leaf spring retainer member 82 is of channel-like formation having rocker portions 86 which engage the inner side of the channel-like formation of the intermediate section 79. Adjacent one end of the retainer member there is a threaded aperture 87 which is engaged by a screw member 88 mounted upon an inwardly bent portion of the intermediate channel section 79. The spring assembly retainer 82 is further- more supported from the intermediate channel section 79 by one or more inwardly bent portions 89 of the channel. An adjustment of the screw member 88 changes the position of the spring retainer 82 with respect to the intermediate section 79 thereby changing the degree of spring bias exerted upon the contact member 85 of the inner section.

In the arrangement shown in Figure 13 it will become apparent that the rocker portions 86 of the leaf spring retainer member 82 space the ends of the springs 83 and 84 a short distance away from the inner surface of the channel-like portion of the intermediate arm section 79, thus permitting the outer arm section 81 to be located within this space. This in turn permits the arm to be extended over a wider range than would be the case if this space were not provided. Thus in this arrangement the same advantage of wide application of the arm for replacement purposes is obtained as was set forth in connection with the embodiment shown in Figure 2.

The outer end of the intermediate section 79 is of channel formation having a portion tapered inwardly to form a guide for the outer section 81. In order that the outer section 81 may be readily adjusted to any desired position and retained in such adjusted position there is provided, as is shown in Figure 14, which is an enlarged view of the portion XIV of intermediate section 79 of Figure 13, in the guide portion of the intermediate section 79 a split-sleeve bearing member 90 which substantially surrounds the outer section 79. The under portion of the split-sleeve bearing member 90 is of such configuration as to be fitted between two sets of inwardly formed portions 91 and 92 of the channel-like portion of the intermediate section 79. Another inwardly bent portion 93 of the intermediate channel section 79 supports in position a leaf spring 94 which bears against the underside of the split-sleeve bearing member 90 thereby applying a bias to frictionally retain in position the outer section 81.

While two embodiments or arrangements for retaining in position the intermediate and outer sections of an arm have been shown, still another arrangement such as shown in Figure 15 may be employed. In this arrangement the intermediate arm section 95 is provided with an inwardly bent portion 96 of the channel which supports a locking member 97. The outer section of the arm 98 is located between the inner surface of the intermediate section 95 and the top surface of the locking member 97. The locking member 97 is formed so as to have stop members 99 at each end, and intermediate these end portions the locking member has surfaces arranged at angles to each other so that when the locking member 97 is moved outwardly toward the arm it acts as a locking wedge.

In Figure 16 there is shown a modification of the structure of an inner section of a windshield wiper arm. In this modification the inner section 100 is formed of material having sufficient flexibility so that this inner section may combine the functions of an inner section and a clamping or locking band such as shown at 73 in Figure 10. A portion of the inner section 100 serves as a cap and extending from the top of the cap are channel like members 101 and 102 which may be drawn together by a screw bolt 103. The remaining sections of the arm are pivotally attached to the inner section 100 by any suitable means. It will be apparent that this modification may be used to an advantage where a very economic manufacture is necessary.

While I have shown certain particular embodiments of my invention, it is to be understood that these are merely illustrated as to the principles disclosed. It will, of course, be understood that I do not wish to be limited thereto, since it is apparent that the principles herein disclosed are susceptible of numerous other applications and modifications may be made in the instrumentalities employed without departing from the spirit and scope of my invention as set forth in the appended claims.

What I claim as new and desire to secure by Letters Patent is:

1. A windshield wiper arm adapted to be attached to a wiper actuating shaft provided with a cylindrical end member, comprising a housing adapted to receive said end member, means mounted within said housing for engaging said end member to secure said housing thereto including a screw mounted on said housing for adjustment exteriorly of said housing, and a wedge member adjustably supported by said screw within said housing.

2. A windshield wiper arm section adapted to be attached to a wiper actuating shaft provided with a collar portion, comprising a housing adapted to fit over said collar portion, means mounted within said housing for securing said housing to said collar portion including an adjustable screw mounted from the top of said housing, a wedge member supported within said housing and arranged to be actuated by said screw, and resilient means operating between said wedge and said housing.

3. The combination comprising a windshield wiper arm having means for attaching said arm to a shaft member of a windshield wiper mechanism, said means comprising a thrust surface for a wedge member, a wedge member positioned between said thrust surface and said shaft member, and screw means mounted on said windshield wiper arm for adjustably positioning said wedge member between said thrust surface and said shaft member.

4. The combination comprising an inner section of a multi-section windshield wiper arm and an actuating shaft of a windshield wiper mechanism, a sleeve mounted on said shaft, said inner section being provided with a pin having a surrounding loose sleeve thereon, a screw member carried by said section, a wedge member mounted on and actuated by said screw member, said wedge member provided with a serrated concave surface for engagement with the sleeve mounted on said wiper shaft, said wedge member having a surface opposed to said concave surface for engagement with said pin-surrounding sleeve for causing said wedge to be thrust against said wiper shaft sleeve upon actuation of said screw member.

5. The combination comprising the inner section of a multi-section windshield wiper arm and an actuating shaft of a wiper mechanism, said actuating shaft having a serrated tapered shoulder and a threaded stud, an apertured metal cup mounted against said tapered shoulder, a washer mounted within said cup, said washer having serrated inner and outer edges and being of harder metal than said cup, said outer edges engaging the inner surface of said cup, a nut on said threaded stud for forcing said cup and said washer against said tapered shoulder, and means mounted on said wiper arm section for securely fastening said arm to said metal cup.

6. The combination comprising an inner section of a multi-section windshield wiper arm and an actuating shaft of a wiper mechanism, said actuating shaft having a serrated tapered shoulder and a threaded stud, an apertured metal cup mounted against said taper shoulder, a washer mounted within said cup, said washer having serrated inner and outer edges and being of harder metal than said cup, said outer edges engaging the inner surface of said cup to securely fasten said washer to said cup, a threaded member mounted on said threaded stud for forcing said cup and said washer against said tapered shoulder, said wiper arm inner section being provided with means for attaching said arm to said metal cup comprising a screw member carried by said section, a wedge member mounted upon and actuated by said screw member, said wedge member being provided with a concave surface for engagement with the outer surface of said metal cup, and being provided with an opposed surface, and abutment means carried by said inner section and engageable with said opposed surface of the wedge to thrust said wedge against said metal cup.

7. A multi-section wiping arm section adapted to be attached to a shaft member of a windshield wiper mechanism, said section having a metal band adapted to embrace said shaft member, said band having end portions arranged at angles to each other and at angles to the plane of the body of said band, each end being provided with a transversely located recess, an operating member located within said recesses, and a screw member mounted on said section, said screw member adjustably supporting said operating member whereby said metal band may be adjusted and fixed to secure said section to a shaft member of a windshield wiper mechanism.

8. In a windshield wiper having an actuating shaft provided with a cylindrical end member, the combination comprising an inner section of a wiper arm having a base portion, spaced sides and a rounded end portion, said rounded end portion being adapted to fit freely over the cylindrical end member of a wiper actuating shaft, a headed screw having the stem portion thereof passed freely through said base portion of said section to the interior thereof, a wedge threadedly engaged and supported by the stem portion of said screw, and means engaged by said wedge whereby said section may be secured to said cylindrical end member.

9. In a windshield wiper having an actuating shaft provided with a cylindrical end member, the combination of an inner section of a wiper arm having a channel portion terminating in a housing portion adapted to fit freely over the cylindrical end member of a wiper actuating shaft, a headed screw mounted with the head thereof on the exterior of the base of said channel portion adjacent said housing portion, said screw having a stem portion passed freely through said channel portion and extending to the interior thereof, and clamping means mounted within said section for securing said section to said aforementioned cylindrical end member, said clamping means including a movable operating member in threaded engagement with the stem of said screw.

THEODORE J. SMULSKI.